United States Patent [19]

Young

[11] Patent Number: 5,558,392
[45] Date of Patent: Sep. 24, 1996

[54] COMBINATION BOAT/CAMPER SHELL/POP-UP TENT

[76] Inventor: Jeffery N. Young, 1116 N. St. Clair Ave., Oklahoma City, Okla. 73107

[21] Appl. No.: 197,926

[22] Filed: Feb. 17, 1994

[51] Int. Cl.$^6$ ................................................. B60P 3/367
[52] U.S. Cl. .................. 296/157; 224/553; 296/100; 296/159; 296/165
[58] Field of Search ......................... 296/159, 157, 296/176, 164, 165, 100, 35.3; 114/352, 353; 224/414, 462, 403, 402, 310, 553

[56] References Cited

U.S. PATENT DOCUMENTS

| | | | |
|---|---|---|---|
| 2,817,852 | 12/1957 | Neilson | 296/157 |
| 3,348,874 | 10/1967 | Gorman | 296/157 |
| 3,411,819 | 11/1968 | Tyree et al. | 296/176 |
| 3,508,787 | 4/1970 | Strong et al. | 296/157 |
| 3,773,379 | 11/1973 | Loiseau | 296/107 |
| 3,901,548 | 8/1975 | Seaman, Jr. | 296/100 X |
| 4,236,474 | 12/1980 | Buirski et al. | 296/157 |
| 4,294,484 | 10/1981 | Robertson | 296/176 |
| 4,420,181 | 12/1983 | Halburg | 296/157 |
| 4,544,195 | 10/1985 | Gunn | 296/165 X |
| 4,756,571 | 7/1988 | Lake | 296/165 |
| 5,102,185 | 4/1992 | Lake | 296/100 X |

Primary Examiner—Dean Kramer
Assistant Examiner—Kia M. Robinson
Attorney, Agent, or Firm—Robert Treece

[57] ABSTRACT

A combination boat/camper shell/pop-up tent apparatus which is mounted to a pickup's bed sidewalls. The apparatus includes an upper and a lower frame. The lower frame is shaped generally to conform with the pickup bed walls, and includes left and right lower side rails, and a lower front rail. The lower rails may be removably secured to the pickup sidewalls by clamps or the like. The upper frame also includes left and right upper side rails and an upper front rail. The upper front rail is hingedly connected to the lower front rail so the rear of the upper frame may be lifted. The upper frame is shaped to accept and hold a camper shell, thus, when the camper shell is on the upper frame and the frame is lifted access to the pickup bed is increased. While the upper frame is in the raised position, tent material may be attached to the frame to provide a tent. Supports hingedly connected to both the upper and the lower frame are provided to hold the upper frame in the raised position. The camper shell may be removed from the upper frame and inverted to provide a boat. Removable seats may also be attached to the boat.

11 Claims, 3 Drawing Sheets

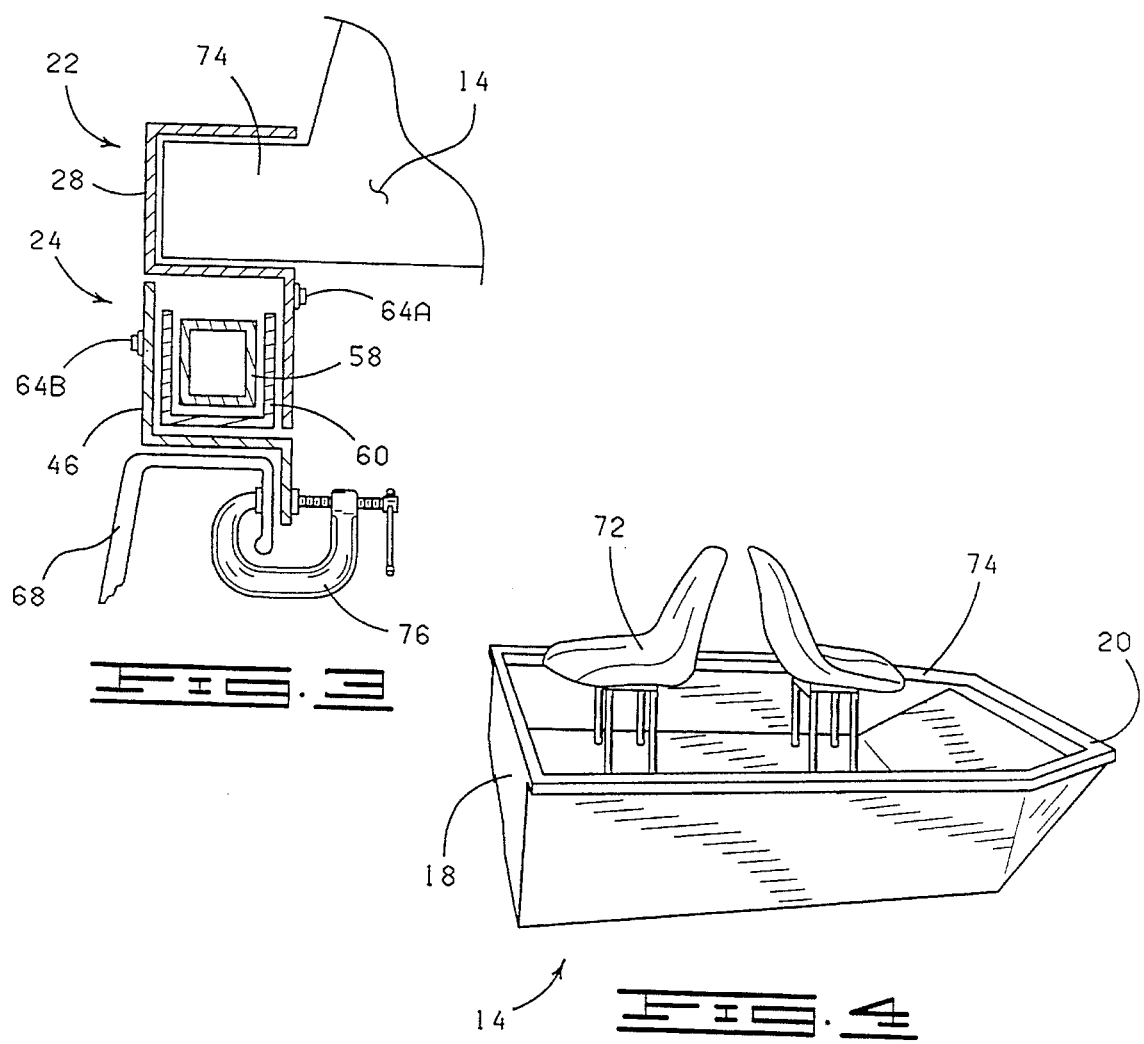
FIG. 3
FIG. 4
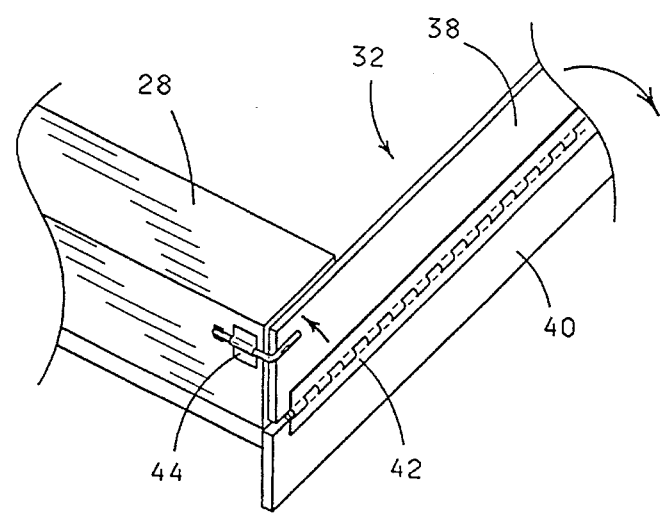
FIG. 5

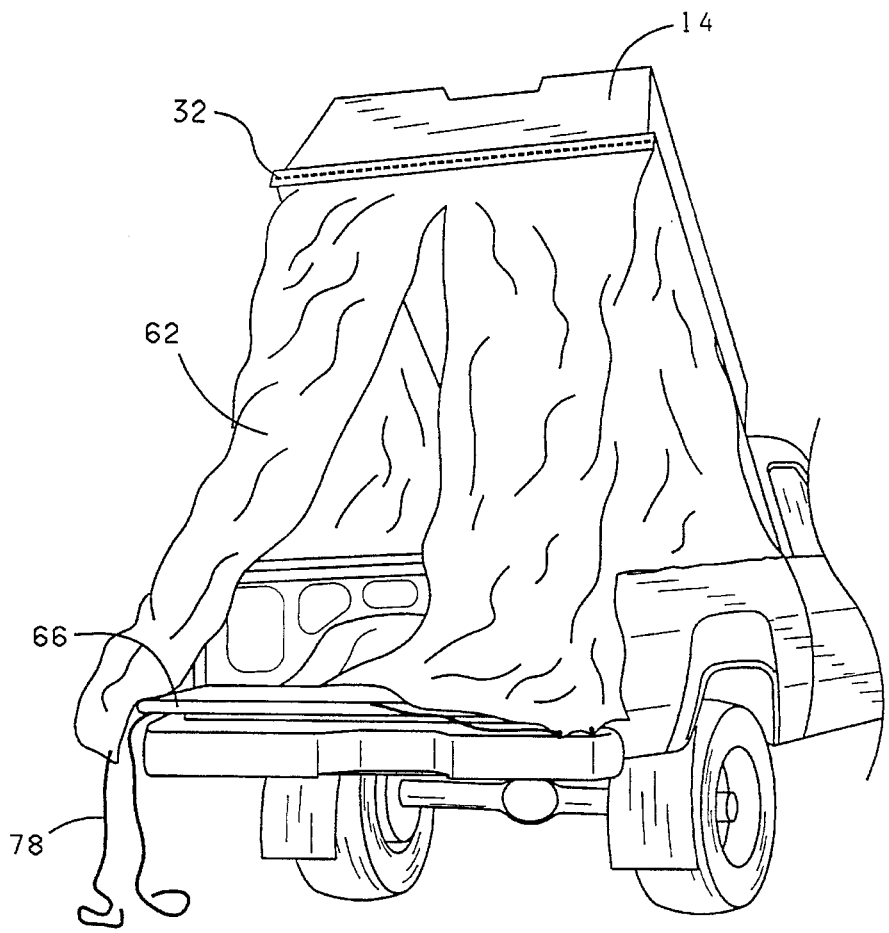
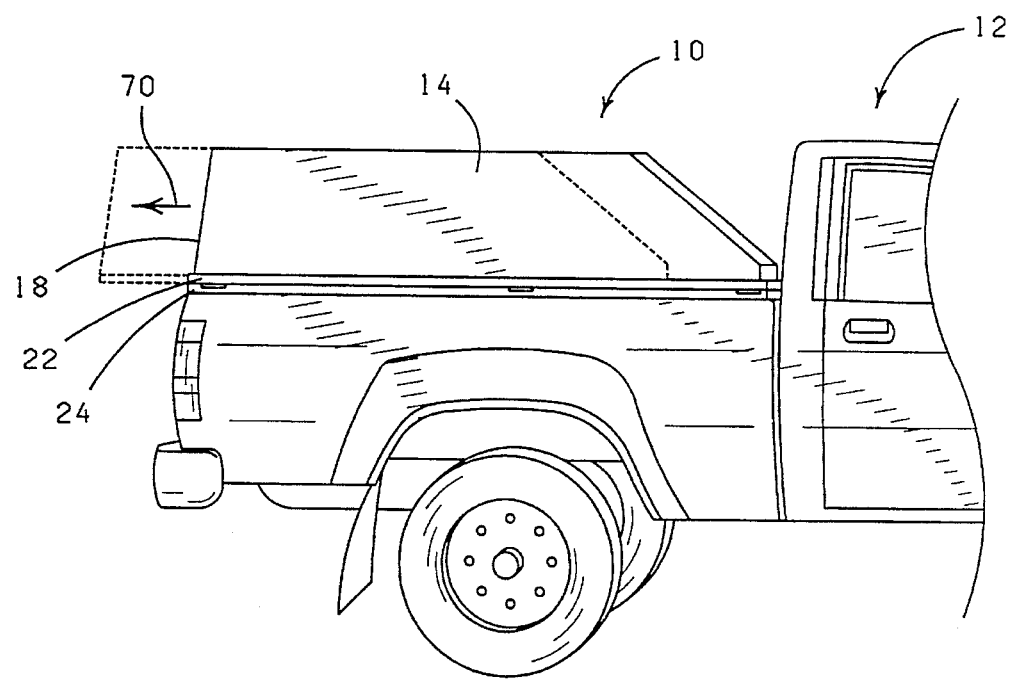

COMBINATION BOAT/CAMPER SHELL/POP-UP TENT

FIELD OF THE INVENTION

The present invention relates to a combination boat, camper shell, tent and frame assembly for use with a pickup. More particularly the present invention provides a boat which may be carried on a pickup bed, and because of the unique frame for attaching the boat to the pickup, the boat also serves as a camper shell. In addition, the camper shell and frame in combination with tent material, provides a tent.

SUMMARY OF THE INVENTION

The modern outdoorsman often uses many large pieces of equipment, such as a boat, a camper and a tent. In addition to the large equipment, he may carry many smaller pieces of equipment such as: outboard motors, oars, life jackets, ropes, stoves, cooking utensils, ice chests, sleeping bags and on and on. In order to take advantage of all this equipment it is often necessary to pull a trailer, or to take more than one vehicle so the equipment may be pulled on more than one trailer. Some may even pull multiple trailers behind one, vehicle and hope they do not need to backup. It is not uncommon to see a family on its way to a campout where the procession of equipment on the road is reminiscent of the Okie's in the Grapes of Wrath. In addition, when the outdoorsman is at home all of this equipment must be stored and most of it serves no useful purpose, other than to kill the grass in the back yard, or to increase the household budget with a storage bill.

The present invention provides a boat which may be carried on a pickup bed. Because of the unique means for attaching the boat to the pickup, the boat also serves as a camper shell and provides a tent. When utilized as a camper shell, the outdoorsman may store his equipment in the back of the pickup where it will be protected from the elements. The boat is easy to attach to or remove from the pickup so that a campout need not end-up as a workout, but can remain the relaxing enjoyment of nature. In addition to all the advantages this invention provides on a campout, it also serves as a unique camper shell for a pickup at home or at work. The camper shell raises from the rear of the pickup to provide increased access to items stored in the pickup. In fact, with the camper shell raised, one may even reach over the sides of a pickup to retrieve items placed near the front of the pickup bed.

Since the boat may be secured to the pickup by a frame which can be clamped to the inside of the pickup bed sidewalls, the pickup is not damaged as it would be if the invention required bolts or screws to secure it to the pickup. Even when used as a tent, one need not attach the tent material directly to the pickup, thus eliminating the need to attach snaps (or other fasting means) to the pickup.

Other features and advantages of the present invention will become apparent from the following detailed description when read in conjunction with the accompanying drawings and appended claims.

BRIEF DESCRIPTION OF THE DRAWINGS

FIG. 3 is a cross sectional view of the frame of FIG. 2 with the frame mounted on a pickup bed sidewall.

FIG. 4 is a perspective view of a boat constructed in accordance with the present invention.

FIG. 5 is an enlarged view of the rear portion of the frame assembly of FIG. 2.

FIG. 6 is a perspective view of a vehicle with an apparatus constructed in accordance with the present invention attached thereto, the boat in the raised position and with tent material attached to the frame.

FIG. 7 is a side view of a vehicle with an apparatus constructed in accordance with the present invention with the boat in the lowered position.

DETAILED DESCRIPTION OF THE PREFERRED EMBODIMENTS

Figure 1:
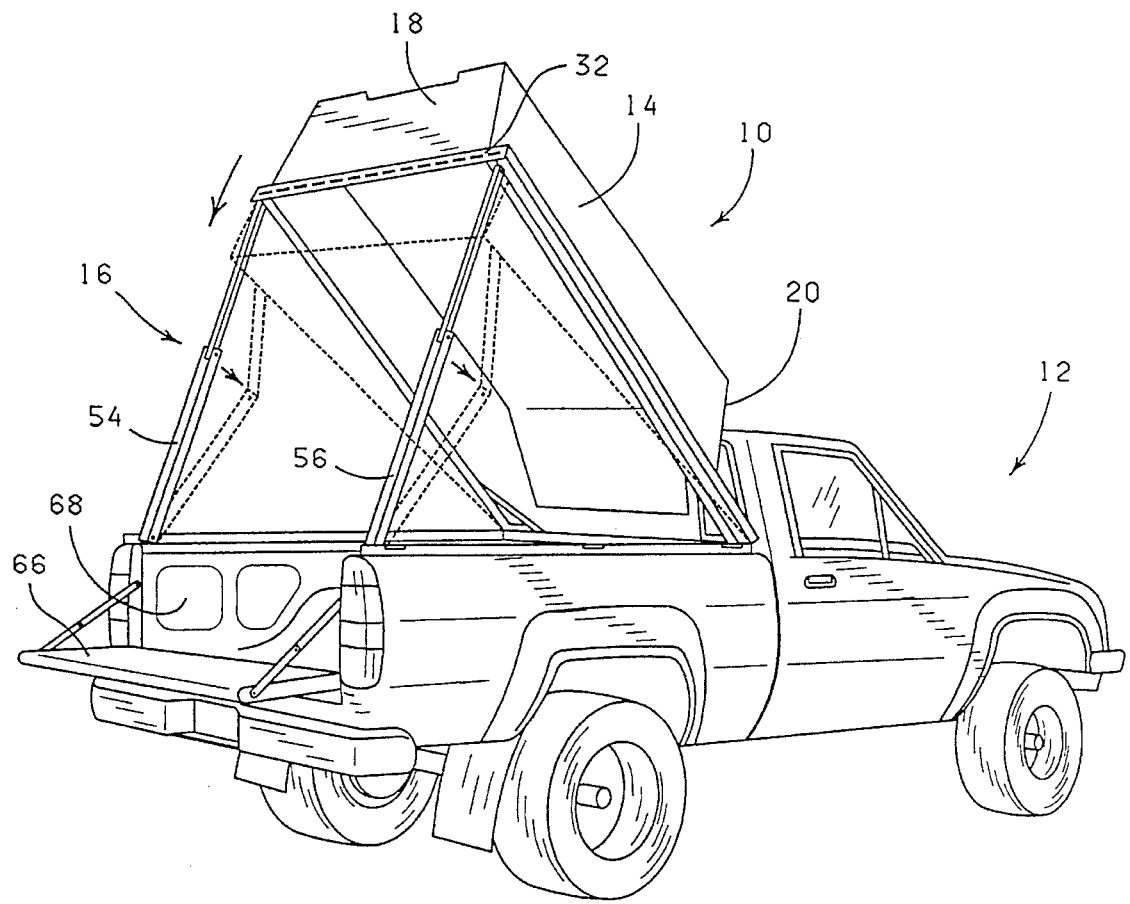
FIG. 1 is a perspective view of a vehicle utilizing an apparatus constructed in accordance with the present invention having a boat on a frame assembly and the boat in a raised position.

Referring to the drawings in detail, and to FIG. 1 in particular, reference number 10 designates a combination boat/camper/tent constructed in accordance with the current invention. The reference number 12 designates a pickup onto which the boat/camper/tent may be mounted. Preferably the boat/camper/tent has two main components; the boat 14 and the frame assembly 16. The frame assembly 16 secures the boat 14 to the pickup 12 and provides support for raising the aft end 18 of the boat 14 relative to the fore end 20 of the boat 14 when it is mounted on the pickup 12.

Figure 2:
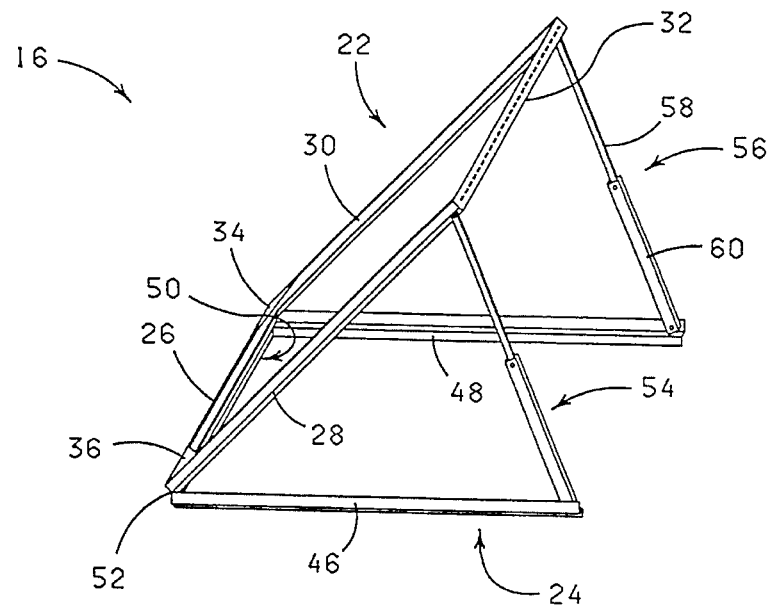
FIG. 2 is a perspective view of a frame assembly constructed in accordance with the present invention.

As is shown in FIG. 2 preferably the frame assembly 16 includes an upper frame 22 and a lower frame 24. While the frame could use only upper frame 22 and the pickup bed wall 68 could serve as the lower frame, the use of a lower frame preserves the vehicle in that it is not necessary to drill into or screw into the vehicle to utilize all the features of the invention. In addition the versatility of the invention is increased if both upper and lower frames are provided. The lower frame 24 is preferably shaped to generally conform with the pickup bed walls 68.

The upper frame 22 includes an upper front rail 26, upper side rails 28 and 30, and an upper rear rail 32. The upper front rail 26 is positioned nearest the cab of a pickup 12 when the frame assembly 16 is on the pickup bed in an operating position. The upper frame 22 includes means for receiving and holding a boat, one suitable means is a U channel as is shown in FIG. 3 into which the railing 74 of the boat 14 may be held. The upper frame 22 may also include corner fillers 34 and 36. The corner fillers 34 and 36 add reinforcement to the upper frame 22 and provide a seal to the fore end 20 of the boat 14 (this portion of the boat being best illustrated in FIG. 4).

As is shown in FIG. 5 the upper rear rail 32 preferably includes a gate member 38 and a brace member 40. The gate member 38 is hingedly attached to the brace member 40 by a hinge, such as hinge 42, so the gate member 38 may opened. Preferably a latch is provided to hold the gate member in the closed position, one suitable latch is illustrated in FIG. 5 and designated by numeral 44.

Referring again to FIG. 2, The lower frame 24 preferably includes lower side rails 46 and 48, and lower front rail 50. The upper and lower frames 22 and 24 are preferably hingedly connected by one or more hinges 52 which are connected to the upper front rail 26 and the lower front rail 50. In an alternated embodiment the hinges 52 may connect the upper side rail 26 or 28 to the lower frame 24. In which case the boat 14 could be raised from the pickup side walls 68 on one side or the other as opposed to being raised at the aft end 18.

Supports 54 and 56 may be used may be provided to hold the upper frame 22 in the raised position. The supports 54 and 56 may each be single rods or bars which are pivotally connected to either the upper or lower frames, however, preferably each support 54 or 56 includes two members. Most preferably, and as may be seen in FIGS. 2 & 3, each support 54 or 56 includes an upper tubing 58 and a lower channel 60. The tubing 58 being hingedly connected to the upper frame 22 and to the lower channel 60, and the lower channel 60 being hingedly connected to the lower frame 24. In this way, the tubing 58 may fold into the channel 60 when the frame assembly 16 is in a lowered position as is shown in FIG. 3.

As is shown in FIG. 6, tent material 62 may be attached to the frame assembly 16 or the boat 14 to provide a tent when the frame assembly 16 is in the raised position. Preferably the tent material 62 is removably attached to the frame assembly 16 by fasteners. One such suitable fastener is snap 64A or 64B (shown in FIG. 3), however there are many other suitable fasteners such as Velcro, straps and zippers which are well known in the art. By removably attaching the tent material 62 to the frame assembly 16, the frame assembly 16 may be used to provide support for the tent material 62 whether the boat 14 is on the frame assembly 16 or not.

Of course the tent material 62 may, or may not include a top. If the tent material 62 does not include a top it is preferable for the boat 14 to be on the frame assembly 16 to provide a top for the tent. In the preferred embodiment, as is shown in FIGS. 3 & 6, the tent material 62 is fastened to the inside surface of the upper frame 22 by fasteners, such as snap base 64A, and fastened to the outside surface of lower frame 24 by fasteners, such as snap base 64B. Corresponding snap heads (not shown) on the tent material may be joined with the snap bases to attach the tent material to the frame assembly. In this embodiment the boat 14 servers as the top for the tent. Tie straps, such as tie strap 78 may be provided to attach the tent material to the pickup tailgate. Mechanical fasteners may also be provided on the tailgate 66, or truck bed sidewall 68 to secure the tent material 62 to the rear of the pickup 12. Preferably, however mechanical fasteners (such as snaps) are only provided on the frame assembly, in this way the pickup is not damaged as it would be if such fasteners were attached directly to the pickup.

In addition, the tent material 62 may include flexible windows, screens and/or zippers to provide ventilation and access to the tent. Windows, screens and zippers are well known in the art, and therefore, are not further described herein.

As is shown in FIG. 7, when the boat 14 is on the frame assembly 16 and the frame assembly 16 is in the lowered position, the boat 14 serves as a camper shell. The boat 14 is held securely on the pickup by the frame assembly 16, but may be removed from the frame assembly by opening gate 38 (FIG. 5) and sliding the boat off of the rear of the pickup in the direction indicated by arrow 70 (FIG. 7).

Referring again to FIG. 3, the boat rail 74 is shaped to slide into the upper frame 22, thus when gate 38 (FIG. 5) is in the closed position the boat 14 is secured to the upper frame 22. FIG. 4 shows the boat 14 removed from the frame assembly 16. Preferably the boat 14 includes one or more removable seats, such as seat 72.

In operation, the frame assembly is placed on the pickup bed wall, it may then be secured to the pickup 12 by suitable means, such as a clamp. One means for securing the frame assembly to the pickup is to use a C clamp like clamp 76 wherein the jaws of the clamp engage the pickup bed sidewall and the inside surface of the lower rails. Other suitable means for securing the frame assembly to the pickup include, but are not limited to, vice grips, screws, bolts or even welding.

After the frame assembly is secured to the pickup, latch 44 is released, and gate 38 is opened, then the boat 14 may be slid into the upper frame 22. Once the boat 14 is in place the rear gate 38 is closed and latch 44 is secured. Now the apparatus is ready to be used as a camper. The aft end of the boat 14 may be raised to provide increased access for loading items into the bed of the pickup 12, or for setting up the tent.

To set up the tent the aft end of the boat is raised and held in a raised position by supports 54 and 56. The tent material 62 is then fastened to the inside of the upper frame 22 by snaps 64A. The tent material 62 is fastened to the outside lower frame 24 by snaps 64B. In this way, moisture which may come in contact with the tent material 62 is directed over the outside of the pickup bed wall 68, keeping the inside of the pickup bed dry. The tent material may also be fastened to the rear of the pickup bed walls and/or the tailgate of the pickup.

To remove the boat 14 from the frame assembly the frame assembly should be in the lowered position as is shown in FIG. 7, then latch 44 is released and gate 38 opened. With the gate 38 open, the boat may be slid in the direction indicated by arrow 70 to remove the boat. The boat 14 may then be inverted and seats 72 attached.

Changes may be made in the combinations, operations and arrangements of the various parts, elements and methods described herein without departing from the spirit and scope of the invention as defined in the following claims.

I claim:

1. A combination boat/camper/tent apparatus for use with a vehicle having pickup bed walls, including a frame assembly which comprises:

a lower frame shaped generally to conform with the pickup bed walls, wherein the lower frame includes a lower front rail, a lower left rail and a lower right rail;

an upper frame wherein the upper frame includes means for receiving a camper/boat and wherein the upper frame comprises: an upper front rail; an upper left side rail; an upper right side rail; and an upper rear rail, and wherein the upper rear rail includes a brace member and a gate wherein the gate is hingedly attached to the brace member and wherein the gate moves from an open position to a closed position; and a hinge attached to the lower front rail and the upper frame for hingedly connecting the lower front rail to the upper frame.

2. The apparatus of claim 1 further comprising a boat having rails wherein the rails are adapted to slide into the upper frame to secure the boat to the upper frame.

3. The apparatus of claim 2 further comprising a latch for holding the gate in a closed position.

4. The apparatus of claim 2 wherein the frame assembly further comprises one or more supports pivotally connected to the frame assembly for supporting the upper frame in a raised position.

5. The apparatus of claim 4 having two supports wherein each support comprises an upper support member pivotally attached to the upper frame, and a lower support member pivotally attached to the lower frame and to the upper support member.

6. The apparatus of claim 2 further comprising tent material, and means for removably attaching the tent material to the frame assembly to provide a tent.

7. The apparatus of claim 6 wherein the upper frame includes an inside surface and the lower frame includes an outside surface and wherein the means for removably attaching the tent material to the frame assembly comprises snap bases secured to the inside surface of the upper frame and snap bases secured to the outside surface of the lower frame.

8. The apparatus of claim 6 further comprising tie straps joined to the tent material for securing the tent material to the vehicle.

9. The apparatus of claim 2 further comprising one or more seats removably attached to the boat.

10. A combination boat/camper/tent apparatus for use with a vehicle having pickup bed walls, including a frame assembly which comprises:

a lower frame shape generally to conform with the pickup bed walls, wherein the lower frame includes a lower front rail, a lower left rail and a lower right rail;

an upper frame wherein the upper frame includes means for receiving and supporting a camper/boat;

a hinge attached to the lower front rail and the upper frame for hingedly connecting the lower front rail to the upper frame;

tent material, and means for removably attaching the tent material to the frame assembly to provide a tent; and wherein the upper frame includes an inside surface and the lower frame includes an outside surface and wherein the means for removably attaching the tent material to the frame assembly comprises snap bases secured to the inside surface of the upper frame and snap bases secured to the outside surface of the lower frame.

11. The apparatus of claim 10 further comprising tie straps joined with the tent material for securing the tent material to the vehicle.

\* \* \* \* \*